United States Patent [19]

Matsumoto

[11] Patent Number: 4,982,453
[45] Date of Patent: Jan. 8, 1991

[54] MECHANISM FOR SUPPORTING TOILET BOWL COVERING MEMBERS

[75] Inventor: Osamu Matsumoto, Tokoname, Japan

[73] Assignee: Inax Corporation, Tokoname, Japan

[21] Appl. No.: 499,687

[22] Filed: Mar. 27, 1990

[30] Foreign Application Priority Data

Apr. 13, 1989 [JP] Japan .................... 1-43597[U]

[51] Int. Cl.$^5$ ............................................. E05F 5/04
[52] U.S. Cl. .................................... 4/248; 4/251; 16/82; 16/86 R; 16/342
[58] Field of Search ............ 4/236, 240, 248, 251, 4/253; 16/82, 85, 86 R, 337, 342; 267/153–155, 157

[56] References Cited

U.S. PATENT DOCUMENTS

| | | | |
|---|---|---|---|
| 3,359,685 | 12/1967 | Hodgen | 16/337 X |
| 3,651,903 | 3/1972 | Butler et al. | 16/82 X |
| 3,820,634 | 6/1974 | Poe | 188/268 |
| 4,639,147 | 1/1987 | Schwarz | 16/342 X |
| 4,766,619 | 8/1988 | Takeda | 4/251 |
| 4,908,905 | 3/1990 | Kanno et al. | 16/82 |

FOREIGN PATENT DOCUMENTS

| | | |
|---|---|---|
| 779751 | 10/1934 | France . |
| 62-261727 | 11/1987 | Japan . |
| 460 | of 1913 | United Kingdom . |

*Primary Examiner*—Henry J. Recla
*Assistant Examiner*—Casey Jacyna
*Attorney, Agent, or Firm*—Kanesaka and Takeuchi

[57] ABSTRACT

A mechanism for supporting toilet bowl covering members, comprises a cylinder fixedly mounted on a toilet body and rotatably supporting a toilet seat or a toilet lid, lock plates fitted within the cylinder and connected for rotation with the toilet seat or the toilet lid, and a plurality of sliding rings fitted around the lock plates and held in sliding contact with the inner peripheral surface of the cylinder and having respective arcuate recesses of gradually variable arcuate lengths for controlling rotation of said lock plates. When the toilet seat or the toilet lid is rotated to close the toilet body, the lock plantes are also rotated to successively come into contact with steps in the recesses. As a result, the sliding rings are successively pressed against the inner peripheral surface of the cylinder so that the member closes slowly.

9 Claims, 3 Drawing Sheets

MECHANISM FOR SUPPORTING TOILET BOWL COVERING MEMBERS

BACKGROUND OF THE INVENTION

1. Field of the Invention

The present invention relates to a mechanism for slowly closing at least one toilet bowl covering member such as a toilet seat and a toilet lid.

2. Description of the Related Art

A conventional toilet bowl is provided with a toilet seat on which a user is seated. Typically, a toilet lid overlies on the toilet seat. The toilet seat and the toilet lid are both rotatably mounted to the toilet bowl by means of a pivot connection. If the user releases his hand from the toilet seat or the toilet lid in its vertical or open position, it is rapidly moved to its closed position under the influence of gravity. Contact of the toilet seat with the toilet bowl or contact of the toilet lid with the toilet seat causes substantial noise, and the user may feel uncomfortableness due thereto. Also, such contact may cause damage to the toilet components. In order to solve such problems, there was provided a damper mechanism designed to slowly close a toilet seat or a toilet lid, such as shown in Japanese laid-open patent publication No. Sho 62-261727. The prior art damper mechanisms are, however, complicated in structure, expensive to manufacture, and often subject to mechanical trouble.

OBJECT AND SUMMARY OF THE INVENTION

In view of the foregoing problems, it is an object of the present invention to provide a simple mechanism for slowly closing a toilet seat and/or a toilet lid.

It is another object of the present invention to provide a mechanism for supporting toilet bowl covering members, which suitably reduces the speed of rotation of a toilet seat or a toilet lid so as to prevent sudden contact of same with a toilet body as well as uncomfortable noise. Advantageously, the present invention is simple in structure. Also, it is highly durable and is economical since sliding rings and other components are free of mechanical trouble.

In accordance with the present invention, there is provided a support mechanism which generally includes a cylinder mounted on a toilet body and supporting at least one of a toilet seat and a toilet lid, lock plates fitted within the cylinder and having one end connected for rotation with the toilet seat or the toilet lid, and a plurality of sliding rings fitted around the lock plates and held in sliding contact with the inner peripheral surface of the cylinder. The sliding rings have respective arcuate recesses with two steps. The circumferential lengths between the two steps of the recesses gradually increase one after another. When the toilet seat or the toilet lid is rotated to close the toilet body, the lock plates are also rotated to successively disengage from one of the steps and come into engagement with the other step. As a result, the sliding rings are pressed against the inner peripheral surface of the cylinder to thereby control the rotation of the lock plates.

A mechanism for slowly closing a toilet seat and/or a toilet lid which generally includes a cylinder, lock plates rotatably fitted within the cylinder, and a plurality of sliding rings held in place between the lock plates and the cylinder. The sliding rings have arcuate recesses of gradually variable circumferential lengths. When the toilet seat or the toilet lid is rotated to open the toilet body, the lock plates are also rotated within the cylinder. At this time, the sliding rings fitted around the lock plates come into contact with and slowly slide along the inner peripheral surface of the cylinder. This allows for easy opening of the toilet seat or the toilet lid. When the toilet seat or the toilet lid is rotated to close the toilet body, the lock plates are also rotated to contact with the step. At this time, the sliding rings are pressed against the inner peripheral surface of the cylinder. This allows for slow rotation of the sliding rings. The sliding rings have respective arcuate recesses of gradually varying arcuate lengths. When the lock plates are rotated, they are successively brought into engagement with the step of each of the recesses whereby the sliding rings are pressed against the inner peripheral surface of the cylinder. Accordingly, the speed of rotation of the lock plates gradually decreases, and the toilet seat or the toilet lid slowly rotates in a direction to close the toilet body.

BRIEF DESCRIPTION OF THE DRAWINGS

A better understanding of the invention may be had by reference to the following detailed description when taken in conjunction with the accompanying drawings; in which.

DETAILED DESCRIPTION OF THE PREFERRED EMBODIMENTS

Figure 1:
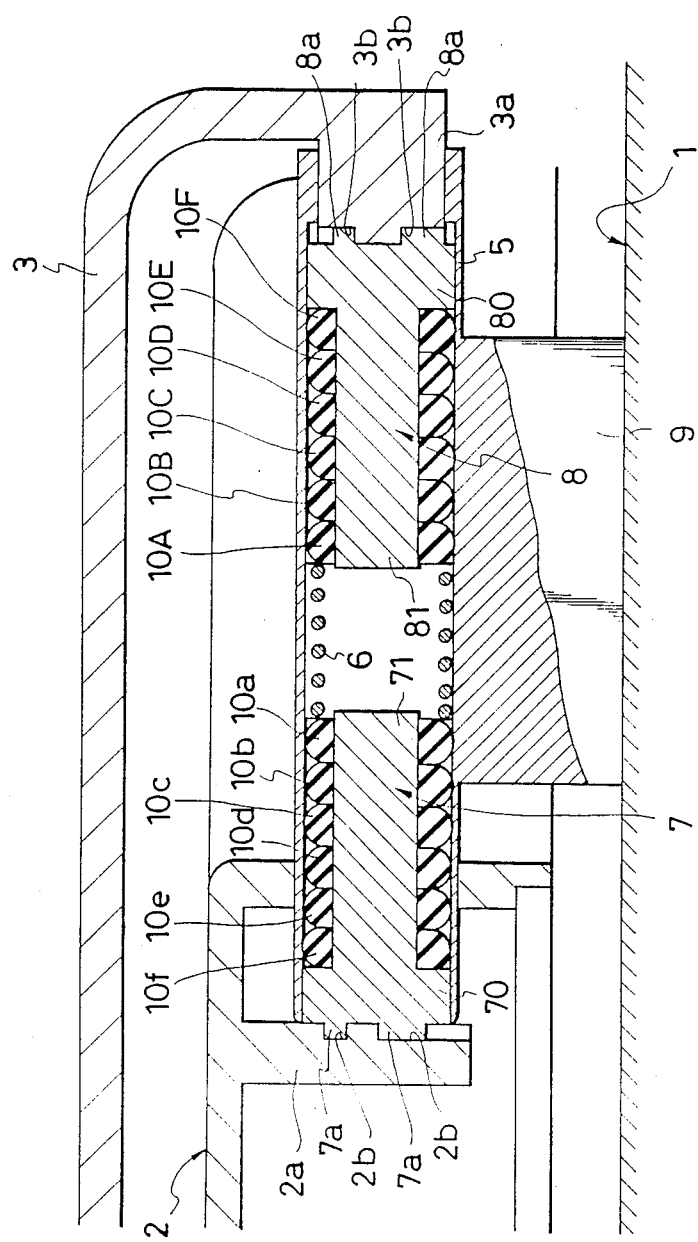
FIG. 1 is a partial sectional view showing the principal part of a mechanism for closing a toilet seat and a toilet cover.
Figure 2:
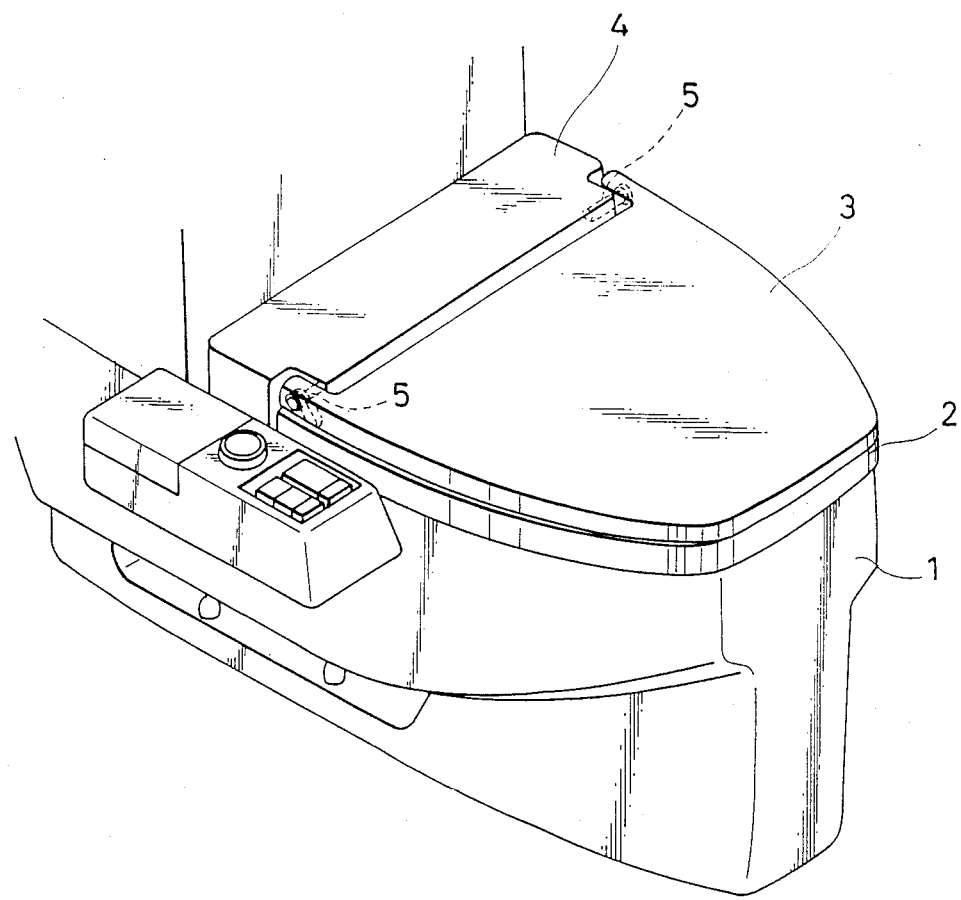
FIG. 2 is a perspective view of a conventional toilet system.

With reference to FIGS. 1 and 2, a conventional toilet bowl or body 1 is provided at its upper side with a toilet seat 2 on which a toilet lid 3 overlies. The toilet seat 2 and the toilet lid 3 can be opened and closed with respect to the toilet body 1. In other words, the toilet seat 2 and the toilet lid 3 are rotatably movable between a vertical position and a horizontal position. A box 4 is situated behind the toilet seat 2 and the toilet lid 3. FIG. 1 shows, in section, a closing mechanism mounted for closing of the toilet seat 2 and the toilet lid 3.

Specifically, the closing mechanism generally includes a cylinder 5 about which the toilet seat 2 and the toilet lid 3 are rotatable. The cylinder 5 is cylindrical in shape and made of metal. The cylinder 5 extends horizontally and has a right end rotatably fitted over a rotatable boss 3a which extends inwardly from the edge of the toilet lid 3 and a left end rotatably supported by a rotatable boss 2a which extends downwardly from the toilet seat 2. This cylinder 5 has an integral base 9 which is, in turn, fixed to the toilet body 1 by a bolt (not shown). The cylinder 5 may be positioned either at the right end or the left end of each of the toilet seat 2 and the toilet lid 3. A spring 6 is disposed centrally within the cylinder 5. A pair of left and right lock plates 7 and 8 is positioned symmetrically with respect to the spring 6. The lock plates 7, 8 include cylindrical bases 70, 80 and plate-like elements 71, 81, respectively. The plate-like elements 71, 81 extend axially of the cylinder 5. A plurality of sliding rings 10a to 10f and 10A to 10F (Illustratively, each lock plate has six sliding rings thereon) surround the lock plates 7 and 8, respectively. The sliding rings 10a, 10b, 10c, 10d, 10e and 10f are identical in structure to the sliding rings 10A, 10B, 10C, 10D, 10E and 10F, respectively.

The outer surfaces of the sliding rings 10a to 10f and 10A to 10F are all in sliding contact with the inner peripheral surface of the cylinder 5. The spring 6 serves to urge the sliding rings 10a to 10f and 10A to 10F toward the cylindrical bases 70, 80 of the sliding plates 7, 8 or in a direction to prevent disengagement of the sliding rings from the lock plates 7 and 8.

The lock plate 7 has at its left end projections 7a fitted into recesses 2b formed in the rotatable boss 2a of the toilet seat 2. Upon rotation of the toilet seat 2, the lock plate 7 can be rotated within the cylinder 5. Likewise, the lock plate 8 has at its right end projections 8a fitted into recesses 3b formed in the rotatable boss 3a of the toilet lid 3. Upon rotation of the toilet lid 3, the lock plate 8 can be rotated within the cylinder 8. The lock plates 7, 8 are made of metal or resin and are plate-like in shape.

Figure 3:
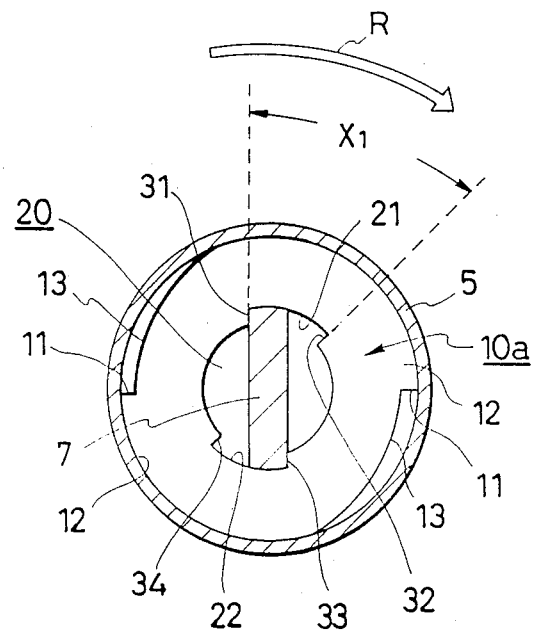
FIG. 3 is a sectional view, on an enlarged scale, of a sliding ring fitted within a cylinder and having a nallowest arcuate recess.
Figure 4:
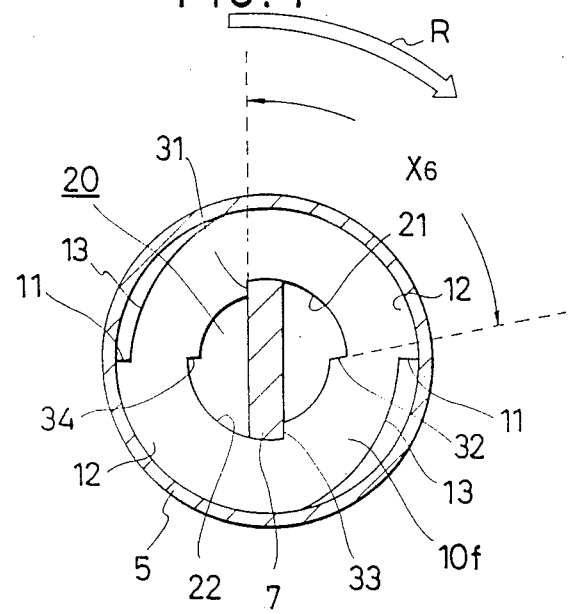
FIG. 4 is a sectional view, on an enlarged scale, of a sliding ring fitted within the cylinder and having a widest arcuate recess.

FIGS. 3 and 4 show the sliding rings 10a, 10f fitted within the cylinder 5, respectively.

The sliding rings 10a to 10f and 10A to 10F are all made of elastomeric materials such as rubber or flexible synthetic resin and are in the form of a ring. Each sliding ring has a pair of diametrically opposite steps 11, 11 at its outer periphery. Arcuate portions 12, 12 extend circumferentially in one direction from the steps 11, 11 and occupy approximately one fourth of the outer periphery respectively. The outer peripheral surface of each of the arcuate portions 12, 12 is in sliding contact with the inner peripheral surface of the cylinder 5. Recesses 13, 13 extend circumferentially in the other direction from the steps 11, 11 and occupy approximately one fourth of the outer periphery. The outer peripheral surfaces of the recesses 13, 13 are spaced apart from the inner peripheral surface of the cylinder 5. Each of the sliding rings 10a to 10f has a centrally disposed opening 20. The opening 20 has a pair of diametrically opposite arcuate recesses 21, 22 which extend circumferentially with a distance $X_1$ (FIG. 3). The recess 21 includes two steps 31, 32 at its opposite ends, and likewise, the recess 22 has two steps 33, 34 at its opposite ends. Opposite side edges of the lock plate 7 are in engagement with the recesses 21, 22, respectively. If the lock plate 7 is rotated in a clockwise direction (direction R in FIG. 3), the opposite edges of the lock plate 7 are moved away from the steps 31, 33 and then brought into engagement with the steps 32, 34, respectively. Further rotation of the lock plate 7 causes the sliding ring 10a to rotate whereby the arcuate portions 12, 12 are strongly pressed against the inner peripheral surface of the cylinder 5. In other words, if the sliding ring 10a is rotated, by the length $X_1$, in a clockwise direction (R), the arcuate portions 12, 12 are deformed in such a direction as to increase the diameter of the sliding ring 10a. This results in an increase in a frictional force Fa between the arcuate portions 12, 12 and the cylinder 5 and causes the sliding ring 10a to rotate slowly.

As shown in FIG. 4, the sliding ring 10f includes two recesses 21, 22 each having an arcuate distance $X_6$ greater than that ($X_1$) of the recesses in FIG. 3. The recess 21 has two steps 31, 32 at opposite ends, and likewise, the recess 22 has two steps 33, 34 at opposite ends, the steps 31, 33 being located in a diametrically opposite relation to the steps 32, 34, respectively. If the lock plate 7 is rotated, with the length $X_6$, in a clockwise direction (direction R in FIG. 4), the opposite edges of the lock plate 7 are moved away from the steps 31, 33 and then brought into engagement with the steps 32, 34, respectively. Further rotation of the lock plate 7 causes the sliding ring 10f to rotate whereby the arcuate portions 12, 12 are strongly pressed against the inner peripheral surface of the cylinder 5. In other words, if the sliding ring 10f is rotated in a clockwise direction (R), the arcuate portions 12, 12 are deformed in such a direction as to increase the diameter of the sliding ring 10f. This results in an increase in a frictional force Ff between the arcuate portions 12, 12 and the cylinder 5 and causes the sliding ring 10f to rotate slowly.

All of the sliding rings 10a to 10f have such recesses 21, 22 with arcuate lengths $X_1$, $X_2$, $X_3$, $X_4$, $X_5$ and $X_6$, respectively. These lengths $X_1$, $X_2$, $X_3$, $X_4$, $X_5$ and $X_6$ are longer in that order. Accordingly, if the lock plate 7 is rotated in a clockwise direction from a position shown in FIG. 3, it is brought into engagement with the steps 32, 34 of the sliding ring 10a, first. The lock plate 7 then comes into engagement with the steps 32, 34 of the sliding rings 10b through 10f, successively. This results in an increase in the number of the sliding rings rotatable together with the lock plate 7. As the lock plate 7 approaches its horizontal position, the frictional forces between the sliding rings 10a through 10f and the cylinder 5 and thus, braking force applied to the lock plate 7 increase.

Again and more specifically, if a user applies downward force to the toilet seat 2 and then releases his hand therefrom, the toilet seat 2 may be rotated in a direction as to close the toilet body 1. The rotation of the toilet seat 2 initiates rotation of the lock plate 7. The lock plate 7 is then moved away from the steps 31, 33 and brought into engagement with the steps 32, 34. Further rotation of the lock plate 7 causes the sliding ring 10a to slidingly contact the inner peripheral surface of the cylinder 5. During the rotation of the sliding ring 10a, the frictional force Fa is gradually applied to the sliding ring 10a from the inner peripheral surface of the cylinder 5. Next, the lock plate 7 comes into engagement with the steps 32, 34 in the sliding ring 10b whereby a frictional force Fb is applied to the sliding ring 10b. As a result, the sum of the frictional force Fa and the frictional force Fb is applied to the lock plate 7. While the sliding ring 10b is being slowly rotated, the lock plate 7 is brought into engagement with the steps 32, 34 in the sliding ring 10c. By the same token, a frictional force Fc is applied to the sliding ring 10c from the inner peripheral surface of the cylinder 5 as it is slowly rotated.

Successively thereafter, the lock plate 7 comes into engagement with the steps 32, 34 of each of the sliding rings 10d, 10e and 10f. The frictional force increases as the sliding rings 10a through 10f are successively rotated together with the lock plate 7. Thus, as the toilet seat 2 approaches its horizontal position, the frictional force and thus, the braking force gradually increase. In other word, as the toilet seat 2 approaches its horizontal position, moment applied to the toilet seat 2 under the influence of the gravity increases and also, the braking force gradually increases. The toilet seat 2 is, thereby, slowly rotated and then, softly and gently brought into contact with the toilet body 1. This prevents sudden contact of the toilet seat 2 with the toilet body 1 and substantial noise due thereto upon closing of the toilet body 1.

Likewise, upon closing of the toilet lid 3, the lock plate 8 successively comes into engagement with the steps 32, 34 of each of the sliding rings 10A, 10B, 10C, 10D, 10E and 10F. Such engagement will gradually reduce a torque by which the toilet cover 3 is rotated.

In order to open the toilet body 1, the user holds the toilet seat 2 or the toilet lid 3 and then, pulls up the same. When the toilet seat 2 or the toilet lid 3 is rotated or moved to its vertical position, the sliding rings $10a$ through $10f$ and the sliding rings 10A through 10F are rotated in a counterclockwise direction (direction opposite to the direction R in FIGS. 3 and 4) together with the lock plates 7, 8 while opposite edges of each of the lock plates 7, 8 are held in engagement with the sliding rings $10a$ through $10f$ and the sliding rings 10A through 10F. During the rotation of the sliding rings, the arcuate portions are deformed in a direction to reduce the diameter of each of the sliding rings $10a$ through $10f$ and the sliding rings 10A through 10F. As such, the sliding rings $10a$ through $10f$ and the sliding rings 10A to 10F can be smoothly rotated, with little frictional force, within the cylinder 5, and the toilet seat 2 or the toilet lid 3 can be lightly opened.

It will be understood that the number of the sliding rings $10a$ to $10f$ and the sliding rings 10A to 10F fitted within the cylinder 5 may suitably be selected to the extent that sliding rings have respective recesses 21, 22 of gradually variable arcuate distance.

Although the preferred embodiment of the invention has been described in detail, it will be appreciated that variations may be made without departing from the spirit of the invention or the scope of the appended claims.

What is claimed is:

1. A mechanism mounted on a toilet bowl having an upper rim defining an upper horizontal surface and pivotally supporting at least one toilet bowl covering member in a manner to allow slow rotation of the same, said mechanism comprising:
   a cylinder on the toilet bowl and extending in a parallel direction to said horizontal surface,
   a plurality of elastomeric rings having outer and inner peripheral surfaces and being coaxially fitted within said cylinder:
   at least one lock plate fitted within said plurality of rings, and having side edges; and
   a boss extending from an edge of said at least one covering member and connected to said lock plate:
   each of said plurality of rings including, at the outer peripheral surface thereof, at least one arcuate portion having first and second ends held in sliding contact with an inner peripheral surface of said cylinder, and a first step formed in said outer periphery at said second end, said at least one arcuate portion extending from said first step to said first end to form an outer recess, said recess tapering from said first step toward said first end of said arcuate portion;
   each of said plurality of rings including, at the inner peripheral surface thereof, inner recesses each having two second steps at opposite ends thereof, said side edges of the lock plate being fitted within said inner recesses and engageable with said second steps: and
   said inner recesses of said plurality of rings having different arcuate lengths, whereby when said at least one covering member is in a vertical position, said side edges of said lock plate are in engagement with one of said second steps in each ring and as said covering member is rotated to a horizontal position, said lock plate is moved away from said ones of said second steps and then brought into engagement with the other second step in said respective rings, successively from the shortest arcuate length of the inner recess to the longest arcuate length of the inner recess, said rings being rotated in the direction in which said outer recess at the outer periphery thereof is tapered.

2. A mechanism according to claim 1, wherein said covering member is a toilet seat.

3. A mechanism according to claim 1, wherein said covering member is a toilet lid.

4. A mechanism according to claim 1, wherein said covering member includes a toilet seat and a toilet lid, and said lock plate includes first and second lock plates, said first lock plate being fitted in one end of said cylinder and connected to said toilet seat, and said second lock plate being fitted in the other end of said cylinder and connected to said toilet lid, said plurality of rings being fitted around said first and second lock plates, respectively.

5. A mechanism according to claim 4, further comprising a spring disposed to urge said plurality of rings fitted around said first lock plates and said plurality of rings fitted around said second lock plates in a direction away from each other.

6. A mechanism according to claim 1, wherein said lock plate has a cylindrical portion held in sliding contact with the inner peripheral surface of said cylinder and a plate-like member integral with said cylindrical portion and extending axially of said cylinder, said plate-like member having opposite side edges being engageable with said second steps.

7. A mechanism according to claim 1, wherein said cylinder has an integral base portion through which said cylinder is fixed to said toilet bowl.

8. A mechanism according to claim 1, wherein said plurality of rings is made of rubber.

9. A mechanism according to claim 1, wherein said plurality of rings is made of synthetic resin.

* * * * *